(12) United States Patent
Zheng et al.

(10) Patent No.: US 12,308,420 B1
(45) Date of Patent: May 20, 2025

(54) ALUMINUM-AIR COMPOSITE BATTERY AND PREPARATION METHOD

(71) Applicants: Hainan University, Haikou (CN); China Huadian Co. Ltd., Beijing (CN); Hainan Lvran clean energy Co. Ltd., Haikou (CN); Huadian Water Technology Co. Ltd., Beijing (CN)

(72) Inventors: Xuerong Zheng, Haikou (CN); Yida Deng, Haikou (CN); Wenjie Huang, Haikou (CN); Yang Wang, Haikou (CN); Beiyang Chen, Beijing (CN); Haozhi Wang, Haikou (CN); Caiyun Zhao, Haikou (CN); Feng Liu, Beijing (CN); Rui Li, Beijing (CN)

(73) Assignees: Hainan University, Haikou (CN); China Huadian Co. Ltd., Beijing (CN); Hainan Lvran clean energy Co. Ltd., Haikou (CN); Huadian Water Technology Co. Ltd., Beijing (CN)

( * ) Notice: Subject to any disclaimer, the term of this patent is extended or adjusted under 35 U.S.C. 154(b) by 0 days.

(21) Appl. No.: 18/957,235

(22) Filed: Nov. 22, 2024

(30) Foreign Application Priority Data

Jan. 10, 2024 (CN) .......................... 202410036653.9

(51) Int. Cl.
*H01M 4/38* (2006.01)
*H01M 4/36* (2006.01)
(Continued)

(52) U.S. Cl.
CPC ........... *H01M 4/364* (2013.01); *H01M 4/381* (2013.01); *H01M 4/387* (2013.01); *H01M 4/50* (2013.01);
(Continued)

(58) Field of Classification Search
None
See application file for complete search history.

(56) References Cited

U.S. PATENT DOCUMENTS

| | | | |
|---|---|---|---|
| 2012/0299550 A1* | 11/2012 | Ein-Eli | H01M 12/06 361/679.01 |
| 2020/0136218 A1* | 4/2020 | Mori | H01M 6/045 |
| 2020/0287232 A1* | 9/2020 | Mukherjee | H01G 11/04 |

FOREIGN PATENT DOCUMENTS

| | | |
|---|---|---|
| CN | 110010885 A | 7/2019 |
| CN | 111326751 A | 6/2020 |
| CN | 113964421 A | 1/2022 |

\* cited by examiner

*Primary Examiner* — Tracy M Dove
(74) *Attorney, Agent, or Firm* — George D. Morgan

(57) ABSTRACT

The present invention discloses an aluminum-air composite battery and a preparation method, which relates to the technical field of batteries. The present invention includes an aluminum-ion battery anode, an aluminum-ion battery cathode, an aluminum-air battery cathode and an alkaline electrolyte; $MnO_2$, $SiO_2$, $TiO_2$, Mg, Ga, Sn, Bi, Zn and Al are mixed in proportion, melted in an inert gas environment, then refined and poured to prepare the aluminum-ion battery anode; $\alpha$-$MnO_2$, nickel oxide and anhydrous ethanol are mixed and calcined, and then mixed with Ketjen black, activated carbon, polytetrafluoroethylene dispersion and anhydrous ethanol into pulp; and the pulp is coated on a nickel fiber felt, pressed by a die and dried to prepare the aluminum-ion battery cathode.

10 Claims, 1 Drawing Sheet

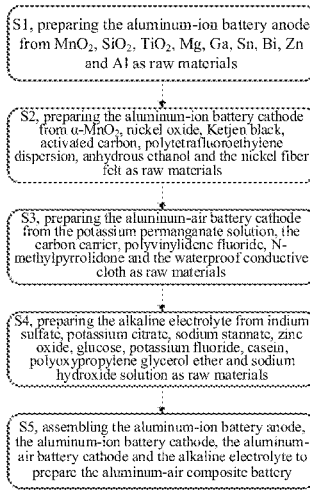

(51) Int. Cl.
*H01M 4/50* (2010.01)
*H01M 4/90* (2006.01)
*H01M 12/02* (2006.01)
*H01M 12/06* (2006.01)

(52) U.S. Cl.
CPC ......... *H01M 4/9016* (2013.01); *H01M 12/02* (2013.01); *H01M 12/06* (2013.01)

S1, preparing the aluminum-ion battery anode from $MnO_2$, $SiO_2$, $TiO_2$, Mg, Ga, Sn, Bi, Zn and Al as raw materials S2, preparing the aluminum-ion battery cathode from α-$MnO_2$, nickel oxide, Ketjen black, activated carbon, polytetrafluoroethylene dispersion, anhydrous ethanol and the nickel fiber felt as raw materials S3, preparing the aluminum-air battery cathode from the potassium permanganate solution, the carbon carrier, polyvinylidene fluoride, N-methylpyrrolidone and the waterproof conductive cloth as raw materials S4, preparing the alkaline electrolyte from indium sulfate, potassium citrate, sodium stannate, zinc oxide, glucose, potassium fluoride, casein, polyoxypropylene glycerol ether and sodium hydroxide solution as raw materials S5, assembling the aluminum-ion battery anode, the aluminum-ion battery cathode, the aluminum-air battery cathode and the alkaline electrolyte to prepare the aluminum-air composite battery

ALUMINUM-AIR COMPOSITE BATTERY AND PREPARATION METHOD

CROSS-REFERENCE TO RELATED APPLICATIONS

The application claims priority to Chinese patent application No. 2024100366539, filed on Jan. 10, 2024, the entire contents of which are incorporated herein by reference.

TECHNICAL FIELD

The present invention belongs to the field of batteries, and particularly relates to an aluminum-air composite battery and a preparation method.

BACKGROUND

An aluminum-air battery is a high-energy chemical battery that uses an aluminum negative electrode and a porous oxygen positive electrode to generate electricity. It has the advantages of high energy density, high specific energy density, high specific power, etc., but also has the disadvantages of the toxicity of aluminum hydroxide, the danger of oxygen, etc. The chemical reaction of the aluminum-air battery is similar to that of a zinc-air battery. The aluminum-air battery takes high purity aluminum Al as a negative electrode, oxygen as a positive electrode, and potassium hydroxide or sodium hydroxide aqueous solution as an electrolyte to ingest oxygen in the air by aluminum to generate a chemical reaction when the battery is discharged. Aluminum and oxygen act to convert into aluminum oxide.

The existing aluminum batteries are excellent in energy and environmental protection, but also have some problems, such as serious anode hydrogen evolution corrosion, expensive high-activity catalyst, etc. Compared with other aluminum batteries, the aluminum-air battery has simple structure, low cost and broad development prospects. Therefore, how to improve the composite ability of the aluminum-air battery, and develop the aluminum-air battery with low cost and simple production while ensuring performance will be the main direction of research of the aluminum-air battery in the future.

SUMMARY

The technical problem to be solved by the present invention is to overcome the deficiency of the prior art to provide an aluminum-air composite battery and a preparation method.

In order to solve the above technical problem, the basic idea of the technical solution adopted by the present invention is:

An aluminum-air composite battery includes an aluminum-ion battery anode, an aluminum-ion battery cathode, an aluminum-air battery cathode and an alkaline electrolyte; $MnO_2$, $SiO_2$, $TiO_2$, Mg, Ga, Sn, Bi, Zn and Al are mixed in proportion, melted in an inert gas environment, then refined and poured to prepare the aluminum-ion battery anode.

$\alpha$-$MnO_2$, nickel oxide and anhydrous ethanol are mixed and calcined, and then mixed with Ketjen black, activated carbon, polytetrafluoroethylene dispersion and anhydrous ethanol into pulp; and the pulp is coated on a nickel fiber felt, pressed by a die and dried to prepare the aluminum-ion battery cathode.

A potassium permanganate solution is mixed with a carbon carrier; the mixture is processed by hydrothermal synthesis, filtration, washing and drying to make powder; the powder is mixed with polyvinylidene fluoride and N-methylpyrrolidone and coated on a waterproof conductive cloth; and after drying and aging, the aluminum-air battery cathode is prepared.

The alkaline electrolyte is prepared from indium sulfate, potassium citrate, sodium stannate, zinc oxide, glucose, potassium fluoride, casein, polyoxypropylene glycerol ether and a sodium hydroxide solution.

Optionally, the aluminum-ion battery anode includes the following raw materials by weight percentage: 0.8% of $MnO_2$, 0.2% of $SiO_2$, 0.01% of $TiO_2$, 0.35% of Mg, 0.07% of Ga, 0.02% of Sn, 0.03% of Bi, 0.35% of Zn and the balance of Al, wherein the average particle size of $MnO_2$, $SiO_2$, $TiO_2$, Mg, Ga, Sn, Bi and Zn materials is between 300 nm and 10 μm, and purity is required to be above 99.99%.

Optionally, a manufacturing process of the aluminum-ion battery anode includes: heating Al metal in a crucible; when temperature rises to 720-735° C., adding $MnO_2$, $SiO_2$, $TiO_2$, Ga, Sn, Bi and Zn metals and fully stirring slowly; when the temperature rises to 760-795° C., adding Mg metal; introducing inert gas into a melt, and keeping the temperature for 30-90 min; sprinkling a powdered flux for skimming; then casting in a die for cooling forming; keeping the temperature of an ingot in a cyclone boiler at 450-500° C. for 8-12 h and then immediately immersing in water, so that microalloy elements are solubilized in an Al matrix; sawing off a head and a tail of the ingot; removing a surface oxide; and cold-rolling to a required thickness. The corrosion resistance of the anode material is improved by Mg element, and the passivating film resistance of an Al surface is reduced by Sn and Ga elements.

Optionally, the aluminum-ion battery cathode has the following raw materials by weight percentage: 28.4% of $\alpha$-$MnO_2$, 13.6% of nickel oxide, 17% of Ketjen black and 41% of activated carbon, wherein a dosage ratio of $\alpha$-$MnO_2$ and nickel oxide with anhydrous ethanol is 3:10, and a dosage ratio of polytetrafluoroethylene dispersion and anhydrous ethanol in the mixed pulp is 1.2:5.

Optionally, a manufacturing process of the aluminum-ion battery cathode includes: mixing $\alpha$-$MnO_2$, nickel oxide and anhydrous ethanol, and then making anhydrous ethanol volatilize to obtain a mixture; heating the mixture at a rate of 10-18° C./min to 750-820° C. for calcining; keeping the temperature for 10-15 h to obtain a nickel-manganese-based composite material; mixing the nickel-manganese-based composite material, Ketjen black, activated carbon, polytetrafluoroethylene dispersion and anhydrous ethanol into pulp; coating the pulp on a nickel fiber felt by 0.5-1 mm; and pressing and drying successively. The nickel-manganese-based composite material is used for simplifying production steps and improving the catalytic performance and the pass yield of the product.

Optionally, the aluminum-air battery cathode includes the following raw materials by weight percentage: 13.5% of potassium permanganate solution, 16.5% of carbon carrier mixture, 18% of polyvinylidene fluoride and 52% of N-methylpyrrolidone.

Optionally, a manufacturing process of the aluminum-air battery cathode includes: dissolving potassium permanganate in deionized water to prepare a potassium permanganate solution; then adding a carbon carrier to the potassium permanganate solution; stirring for 30-100 min to obtain an evenly dispersed potassium permanganate-carbon solution; conducting a high-temperature hydrothermal reaction for the potassium permanganate-carbon solution, and then filtering to obtain filter residues; washing and drying the filter residues for 4 times to obtain carbon-supported manganese dioxide catalyst powder; evenly mixing the carbon-supported manganese dioxide catalyst powder with polyvinylidene fluoride and then fully grinding; adding N-methylpyrrolidone; continuing to grind into pasty pulp; evenly coating the pulp on the surface of the waterproof conductive cloth by 0.1-0.3 mm; drying at 50-80° C. for 8-12 h; and aging at 100-120° C. for 6-9 h. The aluminum-air battery cathode is prepared by the coating method, which has the advantages of good adhesion, difficulty in leakage and accumulation of liquid, and long service life.

The alkaline electrolyte includes the following raw materials by weight percentage: 0.12% of indium sulfate, 2% of potassium citrate, 0.4% of sodium stannate, 0.3% of zinc oxide, 0.35% of glucose, 6% of potassium fluoride, 0.15% of casein, 0.05% of polyoxypropylene glycerol ether and the balance of sodium hydroxide solution. Indium sulfate, potassium citrate, sodium stannate and potassium fluoride can slow down the phenomena of hydrogen evolution corrosion and polarization of the aluminum-ion battery anode.

A manufacturing process of the alkaline electrolyte includes: evenly mixing indium sulfate, potassium citrate, sodium stanylate, zinc oxide, glucose, potassium fluoride, casein and polyoxypropylene glycerol ether to prepare a corrosion inhibitor; adding the corrosion inhibitor to the sodium hydroxide solution; stirring for 20-35 min, so that the corrosion inhibitor is mixed evenly at a temperature of 60-82° C.; and then cooling to room temperature. Through the electrolyte, the cost is reduced and the use safety is improved.

A preparation method of the aluminum-air composite battery includes the following steps:

S1, preparing the aluminum-ion battery anode from $MnO_2$, $SiO_2$, $TiO_2$, Mg, Ga, Sn, Bi, Zn and Al as raw materials;

S2, preparing the aluminum-ion battery cathode from α-$MnO_2$, nickel oxide, Ketjen black, activated carbon, polytetrafluoroethylene dispersion, anhydrous ethanol and the nickel fiber felt as raw materials;

S3, preparing the aluminum-air battery cathode from the potassium permanganate solution, the carbon carrier, polyvinylidene fluoride, N-methylpyrrolidone and the waterproof conductive cloth as raw materials;

S4, preparing the alkaline electrolyte from indium sulfate, potassium citrate, sodium stannate, zinc oxide, glucose, potassium fluoride, casein, polyoxypropylene glycerol ether and sodium hydroxide solution as raw materials; and S5, assembling the aluminum-ion battery anode, the aluminum-ion battery cathode, the aluminum-air battery cathode and the alkaline electrolyte to prepare the aluminum-air composite battery.

After the technical solution is adopted, the present invention has the following beneficial effects compared with the prior art. Of course, any product that implements the present invention does not necessarily achieve all of the following advantages at the same time.

The aluminum-ion battery anode is effectively activated and the hydrogen evolution self-corrosion rate is reduced through $MnO_2$, $SiO_2$, $TiO_2$, Bi and Zn. α-$MnO_2$, nickel oxide and anhydrous ethanol are calcined to simplify the production steps, improve the catalytic performance and the pass yield of the product and reduce the production cost, so as to achieve mass production. The waterproof conductive cloth is used to replace the traditional air-electrode conductive fluid collector and waterproof breathable membranes so that the processing technology of the aluminum-air battery cathode is simplified. The alkaline electrolyte is prepared from indium sulfate, potassium citrate, sodium stannate, zinc oxide, glucose, potassium fluoride, casein and polyoxypropylene glycerol ether, to reduce the manufacturing cost of the alkaline electrolyte and extend the service life of the battery.

The specific embodiments of the present invention will be further described below in detail in conjunction with the drawings.

BRIEF DESCRIPTION OF DRAWINGS

The drawings in the following description are merely some embodiments, and for those ordinary skilled in the art, other drawings can also be obtained according to these drawings without contributing creative labor. In the drawings:

The FIGURE is a flow chart of an embodiment of the present invention.

It should be noted that these drawings and text description are not intended to limit the conception scope of the present invention in any way, but to explain the concept of the present invention to those skilled in the art by referring to specific embodiments.

DETAILED DESCRIPTION OF THE EMBODIMENTS

The present invention is now further described in detail in combination with the drawings.

As shown in the FIGURE, the present embodiment provides an aluminum-air composite battery which includes an aluminum-ion battery anode, an aluminum-ion battery cathode, an aluminum-air battery cathode and an alkaline electrolyte; $MnO_2$, $SiO_2$, $TiO_2$, Mg, Ga, Sn, Bi, Zn and Al are mixed in proportion, melted in an inert gas environment, then refined and poured to prepare the aluminum-ion battery anode.

α-$MnO_2$, nickel oxide and anhydrous ethanol are mixed and calcined, and then mixed with Ketjen black, activated carbon, polytetrafluoroethylene dispersion and anhydrous ethanol into pulp; and the pulp is coated on a nickel fiber felt, pressed by a die and dried to prepare the aluminum-ion battery cathode.

A potassium permanganate solution is mixed with a carbon carrier; the mixture is processed by hydrothermal synthesis, filtration, washing and drying to make powder; the powder is mixed with polyvinylidene fluoride and N-methylpyrrolidone and coated on a waterproof conductive cloth; and after drying and aging, the aluminum-air battery cathode is prepared.

The alkaline electrolyte is prepared from indium sulfate, potassium citrate, sodium stannate, zinc oxide, glucose, potassium fluoride, casein, polyoxypropylene glycerol ether and a sodium hydroxide solution.

The aluminum-ion battery anode includes the following raw materials by weight percentage: 0.8% of $MnO_2$, 0.2% of $SiO_2$, 0.01% of $TiO_2$, 0.35% of Mg, 0.07% of Ga, 0.02% of Sn, 0.03% of Bi, 0.35% of Zn and the balance of Al, wherein the average particle size of $MnO_2$, $SiO_2$, $TiO_2$, Mg, Ga, Sn, Bi and Zn materials is between 300 nm and 10 μm, and purity is required to be above 99.99%. Mg, Ga, Bi and Zn are added in the form of pure substances.

A manufacturing process of the aluminum-ion battery anode includes: heating Al metal in a crucible; when temperature rises to 720-735° C., adding $MnO_2$, $SiO_2$, $TiO_2$, Ga, Sn, Bi and Zn metals and fully stirring slowly; after keeping the temperature for 10 min, when the temperature rises to 760-795° C., adding Mg metal; introducing argon or nitrogen into a melt, and keeping the temperature for 30-90 min; sprinkling a powdered flux for skimming; then casting in a die for cooling to form a bulk alloy ingot; keeping the temperature of the ingot in a cyclone boiler at 450-500° C. for 8-12 h and then immediately immersing in water, so that microalloy elements are solubilized in an Al matrix; sawing off a head and a tail of the ingot; removing a surface oxide; and cold-rolling to a required thickness. The aluminum-ion battery anode is effectively activated and the hydrogen evolution self-corrosion rate is reduced through $MnO_2$, $SiO_2$, $TiO_2$, Bi and Zn. The corrosion resistance of the anode material is improved by Mg element, and the passivating film resistance of an Al surface is reduced by Sn and Ga elements. The grain size and the morphology of the structure can be adjusted through different rolling technologies and heat treatment conditions; a dense oxide film can be formed on the surface of the aluminum-ion battery anode to increase the operating voltage of the battery; and the comprehensive characteristics of the battery are significantly improved.

The aluminum-ion battery cathode in the present embodiment has the following raw materials by weight percentage: 28.4% of $\alpha\text{-}MnO_2$, 13.6% of nickel oxide, 17% of Ketjen black and 41% of activated carbon, wherein a dosage ratio of $\alpha\text{-}MnO_2$ and nickel oxide with anhydrous ethanol is 3:10, a dosage ratio of polytetrafluoroethylene dispersion and anhydrous ethanol in the mixed pulp is 1.2:5, and a dosage ratio of $\alpha\text{-}MnO_2$, nickel oxide, Ketjen black, activated carbon and polytetrafluoroethylene dispersion with anhydrous ethanol is 1:1.15.

A manufacturing process of the aluminum-ion battery cathode in the present embodiment includes: adding 1.5 g of potassium permanganate to 30 mL of deionized water; adding 3 g of concentrated hydrochloric acid with a mass fraction of 45%; stirring at room temperature for 20 min to obtain a uniform solution; then transferring the solution to 100 mL of polytetrafluoroethylene reactor; conducting a hydrothermal reaction at 145° C. for 7 h; cooling to room temperature after the reaction; centrifuging the obtained product; cleaning the precipitate with deionized water and anhydrous ethanol alternately for 5 times; drying the precipitate overnight in vacuum at 55° C. to obtain $\alpha\text{-}MnO_2$; mixing $\alpha\text{-}MnO_2$, nickel oxide and anhydrous ethanol, and then stirring at an environment of 60° C. until the anhydrous ethanol volatilizes to obtain a mixture; grinding the mixture fully; heating the mixture at a rate of 10-18° C./min to 750-820° C. for calcining; keeping the temperature for 10-15 h to obtain a nickel-manganese-based composite material; mixing the nickel-manganese-based composite material, Ketjen black, activated carbon, polytetrafluoroethylene dispersion and anhydrous ethanol into pulp; then coating the pulp on the nickel fiber felt by 0.5-1 mm; and pressing by a hot press and drying in vacuum at 80° C. for 10 h successively. The nickel-manganese-based composite material is used for simplifying production steps, improving the catalytic performance and the pass yield of the product and reducing the production cost, so as to achieve mass production.

The aluminum-air battery cathode in the present embodiment includes the following raw materials by weight percentage: 13.5% of potassium permanganate solution, 16.5% of carbon carrier mixture, 18% of polyvinylidene fluoride and 52% of N-methylpyrrolidone. The carbon carrier is one or a mixture of two or more of nano-acetylene black, activated carbon and graphene.

A manufacturing process of the aluminum-air battery cathode in the present embodiment includes: dissolving potassium permanganate with a concentration of 20-50 g/L in deionized water to prepare a potassium permanganate solution; then adding a carbon carrier to the potassium permanganate solution; stirring at 200-1000 r/min for 30-100 min to obtain an evenly dispersed potassium permanganate-carbon solution; conducting a high-temperature hydrothermal reaction for the potassium permanganate-carbon solution, and then filtering to obtain filter residues, wherein the conditions of the high-temperature hydrothermal reaction are: reaction temperature of 180-200° C., pressure of 0.2-2.0 MPa, and reaction time of 9-12 h; washing the filter residues with alcohol for 4 times, and then drying at 65-95° C. for 6-12 h to obtain carbon-supported manganese dioxide catalyst powder; evenly mixing the carbon-supported manganese dioxide catalyst powder with polyvinylidene fluoride and then fully grinding; adding N-methylpyrrolidone; continuing to grind into a pasty pulp; evenly coating the pulp on the surface of the waterproof conductive cloth by 0.1-0.3 mm; drying at 50-80° C. for 8-12 h; and aging at 100-120° C. for 6-9 h. The waterproof conductive cloth is used to replace the traditional air-electrode conductive fluid collector and waterproof breathable membranes so that the processing technology of the air electrode is simplified and air permeability and water resistance are greatly improved. The aluminum-air battery cathode is prepared by the coating method, which has the advantages of good adhesion, difficulty in leakage and accumulation of liquid, and long service life.

The alkaline electrolyte in the present embodiment includes the following raw materials by weight percentage: 0.12% of indium sulfate, 2% of potassium citrate, 0.4% of sodium stannate, 0.3% of zinc oxide, 0.35% of glucose, 6% of potassium fluoride, 0.15% of casein, 0.05% of polyoxypropylene glycerol ether and the balance of sodium hydroxide solution. Indium sulfate, potassium citrate, sodium stannate and potassium fluoride can slow down the phenomena of hydrogen evolution corrosion and polarization of the aluminum-ion battery anode. The glucose reduces the self-corrosion rate of the aluminum-ion battery anode.

A manufacturing process of the alkaline electrolyte in the present embodiment includes: evenly mixing indium sulfate, potassium citrate, sodium stanylate, zinc oxide, glucose, potassium fluoride, casein and polyoxypropylene glycerol ether to prepare a corrosion inhibitor; adding the corrosion inhibitor to the sodium hydroxide solution; stirring for 20-35 min, so that the corrosion inhibitor is mixed evenly at a temperature of 60-82° C.; and then cooling to room temperature. The static hydrogen evolution self-corrosion rate of the aluminum-ion battery anode in the electrolyte is tested by using a gas collection experiment. The test time is 60 min. It can be concluded that through the electrolyte, the cost is reduced; the use safety is improved; at the same time, the hydrogen evolution self-corrosion rate of the anode can be significantly reduced; and the open circuit potential of the aluminum-ion battery anode can have large negative shift. The aluminum-ion battery anode has good corrosion resistance and high electrochemical activity, and effectively prolongs the battery life.

A preparation method of the aluminum-air composite battery includes the following steps:
  S1, preparing the aluminum-ion battery anode from $MnO_2$, $SiO_2$, $TiO_2$, Mg, Ga, Sn, Bi, Zn and Al as raw materials;
  S2, preparing the aluminum-ion battery cathode from $\alpha\text{-}MnO_2$, nickel oxide, Ketjen black, activated carbon, polytetrafluoroethylene dispersion, anhydrous ethanol and the nickel fiber felt as raw materials;

S3, preparing the aluminum-air battery cathode from the potassium permanganate solution, the carbon carrier, polyvinylidene fluoride, N-methylpyrrolidone and the waterproof conductive cloth as raw materials;

S4, preparing the alkaline electrolyte from indium sulfate, potassium citrate, sodium stannate, zinc oxide, glucose, potassium fluoride, casein, polyoxypropylene glycerol ether and sodium hydroxide solution as raw materials; and S5, assembling the aluminum-ion battery anode, the aluminum-ion battery cathode, the aluminum-air battery cathode and the alkaline electrolyte to prepare the aluminum-air composite battery.

The present invention is not limited to the above embodiments. Anyone should know the structural change made under the inspiration of the present invention. The technical solutions identical or similar to those of the present invention shall fall in the protection scope of the present invention. The technologies, shapes and structures not described in detail in the present invention all belong to the widely-known technology.

What is claimed is:

1. An aluminum-air composite battery, comprising an aluminum-ion battery anode, an aluminum-ion battery cathode, an aluminum-air battery cathode and an alkaline electrolyte, wherein $MnO_2$, $SiO_2$, $TiO_2$, Mg, Ga, Sn, Bi, Zn and Al are mixed in proportion, melted in an inert gas environment, then refined and poured to prepare the aluminum-ion battery anode;

α-$MnO_2$, nickel oxide and anhydrous ethanol are mixed and calcined, and then mixed with Ketjen black, activated carbon, polytetrafluoroethylene dispersion and anhydrous ethanol into pulp; and the pulp is coated on a nickel fiber felt, pressed by a die and dried to prepare the aluminum-ion battery cathode;

a potassium permanganate solution is mixed with a carbon carrier; the mixture is processed by hydrothermal synthesis, filtration, washing and drying to make powder; the powder is mixed with polyvinylidene fluoride and N-methylpyrrolidone and coated on a waterproof conductive cloth; and after drying and aging, the aluminum-air battery cathode is prepared;

the alkaline electrolyte is prepared from indium sulfate, potassium citrate, sodium stannate, zinc oxide, glucose, potassium fluoride, casein, polyoxypropylene glycerol ether and a sodium hydroxide solution.

2. The aluminum-air composite battery according to claim 1, wherein the aluminum-ion battery anode comprises the following raw materials by weight percentage: 0.8% of $MnO_2$, 0.2% of $SiO_2$, 0.01% of $TiO_2$, 0.35% of Mg, 0.07% of Ga, 0.02% of Sn, 0.03% of Bi, 0.35% of Zn and the balance of Al.

3. The aluminum-air composite battery according to claim 2, wherein a manufacturing process of the aluminum-ion battery anode comprises: heating Al metal in a crucible; when temperature rises to 720-735° C., adding $MnO_2$, $SiO_2$, $TiO_2$, Ga, Sn, Bi and Zn metals and fully stirring slowly; when the temperature rises to 760-795° C., adding Mg metal; introducing inert gas into a melt, and keeping the temperature for 30-90 min; sprinkling a powdered flux for skimming; then casting in a die for cooling forming; keeping the temperature of an ingot in a cyclone boiler at 450-500° C. for 8-12 h and then immediately immersing in water, so that microalloy elements are solubilized in an Al matrix; sawing off a head and a tail of the ingot; removing a surface oxide; and cold-rolling to a required thickness.

4. The aluminum-air composite battery according to claim 1, wherein the aluminum-ion battery cathode has the following raw materials by weight percentage: 28.4% of α-$MnO_2$, 13.6% of nickel oxide, 17% of Ketjen black and 41% of activated carbon, wherein a dosage ratio of α-$MnO_2$ and nickel oxide with anhydrous ethanol is 3:10, and a dosage ratio of polytetrafluoroethylene dispersion and anhydrous ethanol in the mixed pulp is 1.2:5.

5. The aluminum-air composite battery according to claim 4, wherein a manufacturing process of the aluminum-ion battery cathode comprises: mixing α-$MnO_2$, nickel oxide and anhydrous ethanol, and then making anhydrous ethanol volatilize to obtain a mixture; heating the mixture at a rate of 10-18° C./min to 750-820° C. for calcining; keeping the temperature for 10-15 h to obtain a nickel-manganese-based composite material; mixing the nickel-manganese-based composite material, Ketjen black, activated carbon, polytetrafluoroethylene dispersion and anhydrous ethanol into pulp; coating the pulp on a nickel fiber felt by 0.5-1 mm; and pressing and drying successively.

6. The aluminum-air composite battery according to claim 1, wherein the aluminum-air battery cathode comprises the following raw materials by weight percentage: 13.5% of potassium permanganate solution, 16.5% of carbon carrier mixture, 18% of polyvinylidene fluoride and 52% of N-methylpyrrolidone.

7. The aluminum-air composite battery according to claim 6, wherein a manufacturing process of the aluminum-air battery cathode comprises: dissolving potassium permanganate in deionized water to prepare a potassium permanganate solution; then adding a carbon carrier to the potassium permanganate solution; stirring for 30-100 min to obtain an evenly dispersed potassium permanganate-carbon solution; conducting a high-temperature hydrothermal reaction for the potassium permanganate-carbon solution, and then filtering to obtain filter residues; washing and drying the filter residues for 4 times to obtain carbon-supported manganese dioxide catalyst powder; evenly mixing the carbon-supported manganese dioxide catalyst powder with polyvinylidene fluoride and then fully grinding; adding N-methylpyrrolidone; continuing to grind into pasty pulp; evenly coating the pulp on the surface of the waterproof conductive cloth by 0.1-0.3 mm; drying at 50-80° C. for 8-12 h; and aging at 100-120° C. for 6-9 h.

8. The aluminum-air composite battery according to claim 1, wherein the alkaline electrolyte comprises the following raw materials by weight percentage: 0.12% of indium sulfate, 2% of potassium citrate, 0.4% of sodium stannate, 0.3% of zinc oxide, 0.35% of glucose, 6% of potassium fluoride, 0.15% of casein, 0.05% of polyoxypropylene glycerol ether and the balance of sodium hydroxide solution.

9. The aluminum-air composite battery according to claim 8, wherein a manufacturing process of the alkaline electrolyte comprises: evenly mixing indium sulfate, potassium citrate, sodium stanylate, zinc oxide, glucose, potassium fluoride, casein and polyoxypropylene glycerol ether to prepare a corrosion inhibitor; adding the corrosion inhibitor to the sodium hydroxide solution; stirring for 20-35 min, so that the corrosion inhibitor is mixed evenly at a temperature of 60-82° C.; and then cooling to room temperature.

10. A preparation method of the aluminum-air composite battery, comprising the following steps:

S1, preparing the aluminum-ion battery anode from $MnO_2$, $SiO_2$, $TiO_2$, Mg, Ga, Sn, Bi, Zn and Al as raw materials;

S2, preparing the aluminum-ion battery cathode from α-$MnO_2$, nickel oxide, Ketjen black, activated carbon, polytetrafluoroethylene dispersion, anhydrous ethanol and the nickel fiber felt as raw materials;

S3, preparing the aluminum-air battery cathode from the potassium permanganate solution, the carbon carrier, polyvinylidene fluoride, N-methylpyrrolidone and the waterproof conductive cloth as raw materials;

S4, preparing the alkaline electrolyte from indium sulfate, potassium citrate, sodium stannate, zinc oxide, glucose, potassium fluoride, casein, polyoxypropylene glycerol ether and sodium hydroxide solution as raw materials; and S5, assembling the aluminum-ion battery anode, the aluminum-ion battery cathode, the aluminum-air battery cathode and the alkaline electrolyte to prepare the aluminum-air composite battery.

\* \* \* \* \*